United States Patent [19]
Hogen Esch

[11] Patent Number: 5,608,380
[45] Date of Patent: Mar. 4, 1997

[54] DEACTIVATION AND CODING SYSTEM FOR A CONTACTLESS ANTITHEFT OR IDENTIFICATION LABEL

[75] Inventor: Johannes H. L. Hogen Esch, Aalten, Netherlands

[73] Assignee: N.V. Nederlandsche Apparatenfabriek NEDAP, De Groenlo, Netherlands

[21] Appl. No.: 444,377

[22] Filed: May 18, 1995

[30] Foreign Application Priority Data

May 18, 1994 [NL] Netherlands ............................. 9400810

[51] Int. Cl.$^6$ ................................................. G08B 13/187
[52] U.S. Cl. ................................................. 340/572
[58] Field of Search ............................................... 340/572

[56] References Cited

U.S. PATENT DOCUMENTS

| | | |
|---|---|---|
| 4,567,473 | 1/1986 | Lichtblau .................. 340/572 |
| 5,081,445 | 1/1992 | Gill et al. .................. 340/572 |
| 5,103,210 | 4/1992 | Rode et al. ................. 340/572 |
| 5,187,466 | 2/1993 | Pichl ........................ 340/572 |
| 5,218,189 | 6/1993 | Hutchison .................. 340/572 |
| 5,446,447 | 8/1995 | Carney et al. .............. 340/572 |

FOREIGN PATENT DOCUMENTS

| | | |
|---|---|---|
| 0280361 | 2/1988 | European Pat. Off. . |
| 0472073 | 8/1991 | European Pat. Off. . |

*Primary Examiner*—Glen Swann
*Attorney, Agent, or Firm*—Jacobson, Price, Holman & Stern, PLLC

[57] ABSTRACT

A deactivation and coding system for a contactless antitheft or identification label, uses a pyrotechnic material to burn away a track portion, whereby an electrical connection is severed. The labels in the system according to the invention consist of tuned circuits in the form of one or more coil/capacitor combinations. Deactivation can be effected by severing the connection between a coil and the associated capacitor. Coding can be effected by severing the connection with one of several parallel-connected coils or capacitors. Coding can also be effected by removing an initial short-circuit of one of several series-connected capacitors.

The pyrotechnic material may consist of one or a combination of the mixtures $Pb_3O_4$, Si, Ti and $Fe_2O_3$; $PbCrO_4$, and Zr; $Pb_3O_4$, Si and $KNO_2$; and $Pb_3O_4$ and Si or a mixture having comparable properties. The heat released during the combustion reaction can be used in combination with a thermosensitive paper for the purpose of causing readable information to appear on the label upon deactivation or coding. The use of protective foils can prevent damage to the goods on which the labels are provided.

24 Claims, 6 Drawing Sheets

DEACTIVATION AND CODING SYSTEM FOR A CONTACTLESS ANTITHEFT OR IDENTIFICATION LABEL

BACKGROUND OF THE INVENTION

This invention relates to a contactless label for antitheft or identification purposes which comprises an electric circuit, to an electric circuit for such a label and to a deactivation and/or coding system comprising such labels. This invention relates in particular to the deactivation or coding of electromagnetic antitheft labels which are used only once and so are not removed during checkout at a checkout counter, as well as to the coding or programming of identification labels for the purpose of contactless identification of humans, animals or goods.

The operation of known electromagnetic antitheft systems with single-use labels is based on two principles. One system utilizes an electromagnetic radiofrequency (RF) field of a frequency of approximately 8 MHz and works with labels or tags which contain a tuned circuit consisting of a coil and a capacitor. The other system utilizes an electromagnetic RF field of a frequency of approximately 4 kHz and works with labels containing a strip of amorphous metal having specific magnetic properties.

The present invention relates to the first type of antitheft system, where the coil and the capacitor in the tags are typically formed by aluminum foil provided on two sides of a carrier material of polyethylene (PE) or polypropylene (PP). The formation of this coil and capacitor is effected by means of an etching process, with prior arrangement of a mask on the portions which are not be etched away. An example of a label based on a principle as described above is the label according to applicant's European patent no. 0,280,361.

The tags for the above-mentioned antitheft systems are mostly fitted in the store where the goods are sold. When the goods are being checked out at a checkout counter, the tags are deactivated, so that no alarm is produced when the goods leave the store via the detection systems arranged at the exit. For deactivation of the tags, mostly a system is used which effects an electric breakdown at a weak spot priorly provided in the capacitor, which causes a short circuit rendering the tag inactive in the antitheft system.

The provision of this weak spot in the capacitor can be effected in the manner as indicated in U.S. Pat. No. 4,567,473 (Checkpoint), where a weak spot is provided through forcing. It can also be effected, for instance, in the manner according to U.S. Pat. No. 5,187,466 (Fritz Pichl), where by means of electric contacts a break is provided during the production process, which break is then removed again by passing a current through the break formed, so that a weak spot remains.

A further alternative is the method according to European patent application 0,472,073, also of Fritz Pichl, whereby through a chemical reaction conduction is effected to generate a short circuit.

All of these methods have the disadvantage that the short circuit formed in the capacitor during deactivation is highly vulnerable and sensitive to mechanical movements because the short circuit formed consists of an extremely thin layer of condensed aluminum. Accordingly, it happens regularly that this short circuit disappears spontaneously so that the label becomes active again and will set off an alarm, for instance in a next store which is being visited. This, of course, leads to undesirable situations.

SUMMARY OF THE INVENTION

One aspect of the label and the electric circuit according to the invention is that they overcome this disadvantage. The label is characterized in that it comprises a pyrotechnic mixture which is provided adjacent at least one electroconductive connection of the electric circuit, in such a manner that the pyrotechnic mixture upon being ignited severs the electroconductive connection by combustion, with the electrical properties of the electric circuit altering as a result of the severance of the electroconductive connection.

If the label according to the invention is used in an antitheft system, the label can be deactivated by severing the electrical connection. In that case, after the connection has been severed in accordance with the invention, the label cannot heal in any manner.

A clear trend to be observed at present is the transition to so-called source tagging, i.e. the tags are not fitted in the store where the goods are sold, but directly at the manufacturer's during the production process of the goods. This has the advantage that it can often be effected automatically and that it does not entail any additional operations, and hence costs, for the trade. If goods are fitted with antitheft tags directly at the manufacturer's, it is desirable that these tags can be activated if they are introduced into a protected space because not every store is fitted with an antitheft security system. In the latter group, activation could then be omitted, so that after sale no alarm is produced in stores which do have an antitheft system.

If the electric circuit according to the invention is used in an antitheft system, the label can also be activated by severing the electrical connection referred to.

Similarly, the labels according to the invention can be used in an identification or coding system. By severing electrical conductors in accordance with the invention and thereby switching on or off capacitors and/or coil parts for the label, one or more resonance frequencies of the label can be altered. These resonance frequencies then represent the codes of the label. These identification labels can for instance be used for granting access or as parking tickets. Also, a coding, once it has been provided, can be subsequently altered, so that, for instance, value can be booked off, for instance for the purpose of making (public) telephone calls or for the purpose of traveling by public transport.

Since in the label according to the invention heat is released by combustion of the pyrotechnic material, it is additionally possible to arrange for the contactless remote provision of readable information using a thermosensitive layer which, for instance, turns black under the influence of heat, for the purpose of indicating, for instance, the residual value of the card or for providing other readable information.

By the provision of readable information the possibility of fraud can be prevented, which can also be achieved by choosing two resonance frequencies for the separate logic levels of a data bit or by including so-called checksum and/or parity bits in the code.

The object of the present invention is to provide for all of the above-mentioned application possibilities. The invention will be further explained hereinafter with reference to the drawings. In the drawings:

DESCRIPTION OF THE PREFERRED EMBODIMENTS

The operation of the deactivation or coding mechanism according to the invention is based on the use of so-called pyrotechnic mixtures which are electrically ignited by spark-over and then destroy an electrical connection by burning away a part of an aluminum track, whereby the connection of a capacitor part or a coil part with the remainder of an electric circuit of the label is severed and whereby one or more resonance frequencies of the circuit are removed or altered. Also, by the removal of a connection, a short-circuited part of the electric circuit can be activated. The above-mentioned pyrotechnic mixtures can be composed in such a manner that they also include in the combustion reaction the subjacent aluminum that is to be removed, so that it is removed completely. Of course, the point is to arrange for this combustion to occur at a lowest possible temperature for achieving the stated objective and in a manner so controlled as to eliminate any danger of this combustion expanding beyond the area contemplated. Optionally, an additional protection against such expansion can be provided on the label in the form of fire-resistant foil.

Without being exhaustive, a number of examples of pyrotechnic mixtures are given here which can be used in the deactivation and/or coding system according to the invention, viz. $Pb_3O_4$, Si, Ti and $Fe_2O_3$; $PbCrO_4$ and Zr; $Pb_3O_4$, Si and $KNO_3$; and $Pb_3O_4$ and Si.

Instead of using aluminum tracks in the label and pyrotechnic mixtures which are suitable for aluminum, it is, of course, also possible to use tracks made of, for instance, copper, together with pyrotechnic mixtures which have been optimized for copper.

Of course, it would also be possible to use detonatable material, for instance based on silver azide. However, the use of these materials, especially during production, involves such risk aspects that it is not considered practically feasible. Thus in the appended claims the term pyrotechnic mixture is understood to include detonatable materials, while the term label is understood to include tags.

It is of great importance in the tags or labels according to the invention that the combustion give rise to very little or no formation of gas. This can be achieved by using for the application to the tag an adequate binder for which a solvent is needed which also involves little or no formation of gas.

Figure 1:
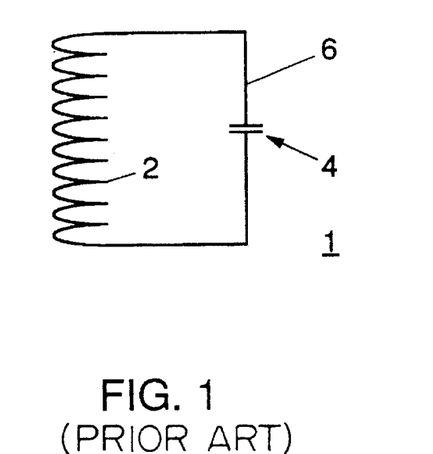
FIG. 1 shows a conventional electric circuit for a label or tag.
Figure 2:
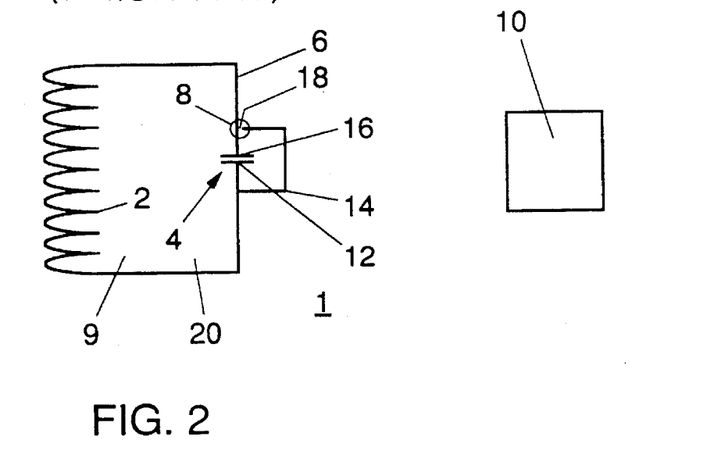
FIG. 2 shows a first possible embodiment of an electric circuit for a label or tag according to the invention.
Figure 2A:
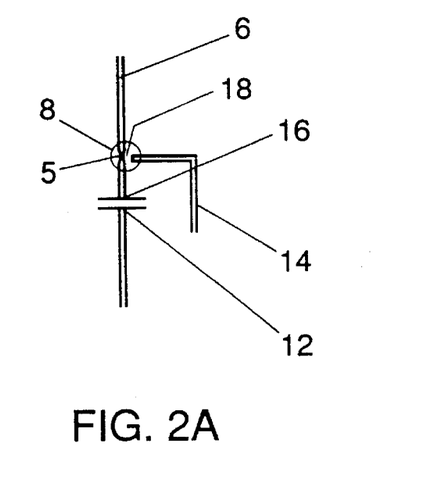
FIG. 2A shows a detail of FIG. 2.

The operation of antitheft systems which are designed to work with labels or tags according to the invention is typically based on the detection of energy absorption at the resonance frequency of a tuned LC resonance circuit as depicted in FIG. 1. To deactivate a tag comprising such an electric circuit 1, the connection between the coil 2 and the capacitor 4 has to be broken. To that end, in accordance with the invention, on a narrowed portion 5 of a connecting track 6 forming an electrical connection, a pyrotechnic mixture 8 is provided by means of a printing technique (see also FIG. 2). To ignite this mixture, a spark is required, which is generated by transmitting, by means of a transmitter 10, an electromagnetic energy pulse at the resonance frequency of the electric resonance circuit 9 formed by capacitor 4 and coil 2. Thus the highest electrical voltage is created over the capacitor 4 and therefore the pyrotechnic mixture 8 is preferably provided on a track portion of the connection 6 which is located close to the junction with the capacitor 4. As indicated in FIG. 2, starting from a first side 12 of the capacitor 4, a second conductor 14 is arranged, which initially also connects the other capacitor surface 16 with the above-mentioned narrowed track portion 5 but which is subsequently cut, for instance by means of a laser of by etching, so that an extremely narrow interruption 18 is formed, directly below the position where subsequently the pyrotechnic mixture 8 is provided (see FIG. 2A). The application of the energy impulse at the resonance frequency causes a spark-over between the conductor 6 and the second conductor 14, directly under the pyrotechnic mixture 8, which is thereby ignited and as a result of which the narrowed track portion 5 is removed, whereafter the electric circuit 1 no longer resonates. The electric resonance circuit 9 is a tuned circuit which, in this example, together with the second conductor 14, forms ignition means 20 for igniting the mixture 8.

Figure 3:
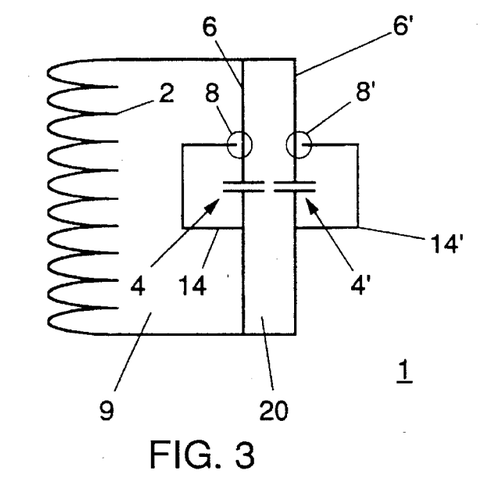
FIG. 3 shows a second embodiment of an electric circuit for a label or tag according to the invention.

Since, as described above, it is sometimes necessary to be able to activate the label, it is also possible, as depicted diagrammatically in FIG. 3, to remove a connection in order to eliminate a part of the electric circuit 1, so that the resonance frequency alters, for instance from a lower to a higher frequency, and the circuitry becomes active at the desired resonance frequency of the antitheft system.

The electric circuit of the label shown in FIG. 3 comprises, in addition to the elements depicted in FIG. 2, a second capacitor 4', which is connected in parallel to the capacitor 4. Further, a second pyrotechnic mixture 8' and a third conductor 14' are arranged in a manner comparable to that discussed with reference to FIG. 2. The capacitors 4, 4' and the coil 2 jointly form an electric resonance circuit 9 having a resonance frequency $F_o$. By transmitting an electromagnetic pulse of frequency $F_o$, the voltage over the two capacitors 4 and 4' will rise. When the transmitted electrical pulse has a sufficiently high intensity and a sufficient pulse width, there will occur a spark-over between the conductor 14 and the conductor 6, or between the conductor 14' and the conductor 6', with the result that the pyrotechnic mixture 8 or the pyrotechnic mixture 8' is ignited.

In the electric circuit according to FIG. 3 it is not predetermined which pyrotechnic mixture 8 or 8' will ignite. The chances of both mixtures igniting simultaneously, however, are particularly small.

In fact, when, for instance, a breakdown occurs between the conductor 14 and the conductor 6, not only the voltage over the capacitor 4 will fall, but so will the voltage over the capacitor 4'. In other words, in that case no breakdown between the conductor 14' and the conductor 6' will occur anymore, the assumption being, however, that an electromagnetic pulse is transmitted and that no continuous electromagnetic field of a frequency $F_o$ is transmitted.

When, for instance, the pyrotechnic mixture 8 has combusted, the electrical connection 6 will be severed. In that case, the electric resonance circuit 9 is formed exclusively by the coil 2 and the capacitor 4'. The resonance frequency will take a new value $F_o'$, which is greater than $F_o$.

When the two capacitors 4 and 4' have the same capacitance, it will make no difference which of the two pyrotechnic mixtures 8 or 8' is ignited, since after activation the electric resonance circuit 9 will always have the same resonance frequency $F_o'$. It is noted that the electric circuit according to FIG. 3 can be subsequently deactivated by again transmitting a strong electromagnetic pulse of a frequency $F_o'$. In that case, in this example the voltage over the capacitor 4' will rise until the pyrotechnic mixture 8' is inflamed by a spark crossing between the conductors 6' and 14', with the result that the conductor 6' is severed by combustion.

Figure 4:
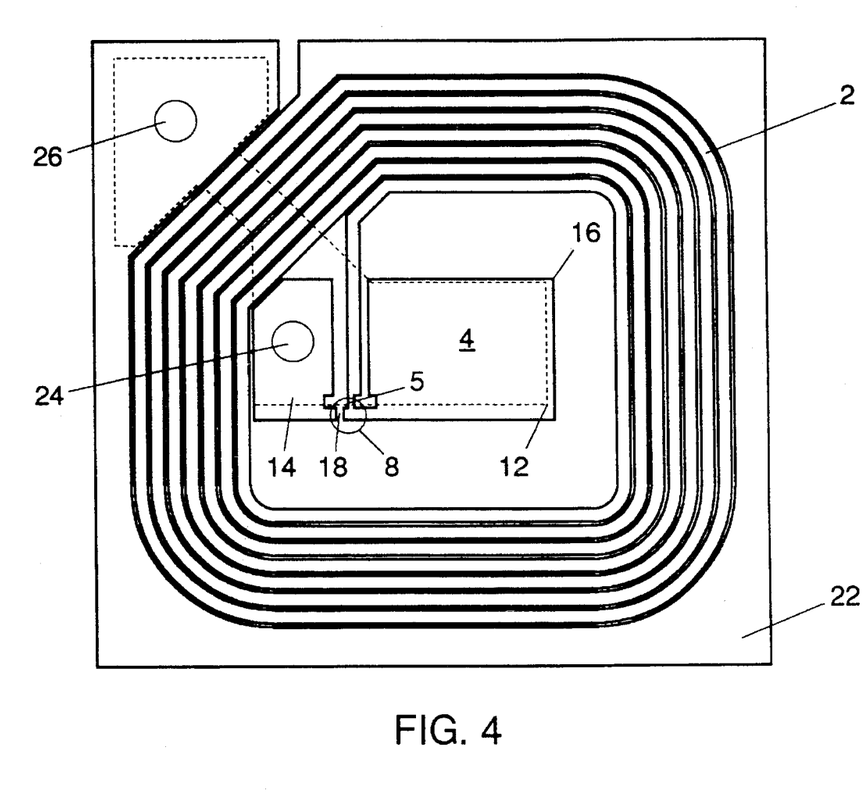
FIG. 4 shows a third embodiment of an electric circuit for a label or tag according to the invention.

FIG. 4 shows a further elaboration of a label 22 having an electric circuit according to FIG. 2. In the antitheft label 22 as shown on an enlarged scale in FIG. 4, where the capacitor surfaces 12 and 16 are provided on opposite sides of a carrier foil 22, it is required that in order to enable spark-over, first a through-connection 24 through the carrier foil 22 be made in order to be able to generate the highest possible electrical voltage at the point 18 of the breakdown. This through-connection 24 is made by forcing the aluminum through the foil at a position intended for the purpose, so that an electrical connection is formed. Such a connection 26 is also necessary to connect the coil, which is provided on one side of the foil 22, to the capacitor surface 12 on the other side.

It is also possible to provide the pyrotechnic mixture between the connection to the capacitor surfaces in the carrier material during the production process of the labels. However, this requires that first openings be provided in the carrier foil, which, it is noted, is less simple to realize in the production process.

Figure 5:
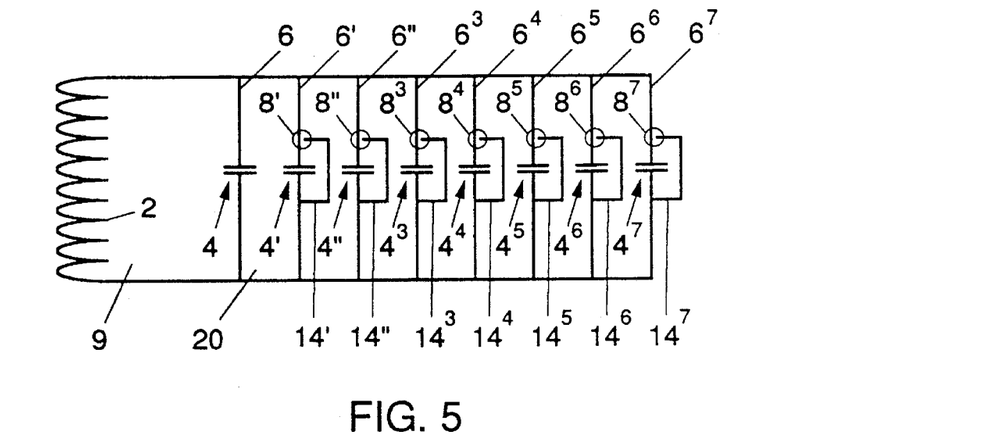
FIG. 5 shows a fourth embodiment of an electric circuit for a label or tag according to the invention.

In an alternative embodiment of a contactless identification label according to the invention as diagrammatically depicted in FIG. 5, the above-described pyrotechnic material is used to cause the label to resonate at different resonance frequencies, each separately representing a different code, for instance.

The electric circuit according to FIG. 5 comprises an electric resonance circuit 9 in the form of the coil 2 and a number of parallel-connected capacitors 4, 4', 4", ... $4^{(7)}$. Except at capacitor 4, the connection tracks 6', 6", ... $6^{(7)}$ are each provided with a pyrotechnic mixture 8', 8", ... $8^{(7)}$, which can be ignited with the aid of conductors 14', 14", ... $14^{(7)}$. All capacitors together with the coil form an electric resonance circuit 9 having the resonance frequency $F_o$.

By radiating a strong electromagnetic pulse of frequency $F_o$, as described with reference to FIG. 3, one of the pyrotechnic mixtures will be activated, with the result that one of the capacitors will no longer form part of the electric resonance circuit 9. The resonance frequency of the circuit will then change to $F_o'$. By again radiating an electromagnetic pulse, of frequency $F_o'$ this time, it is possible, if so desired, to separate another capacitor from the electric resonance circuit 9. If all capacitors have the same capacitance, it is possible to pre-determine a new resonance frequency when yet another capacitor is separated from the electric resonance circuit. The order in which the capacitors are separated has no influence on this. Thus the label according to FIG. 5 can be programmed by separating a number of capacitors from the electric resonance circuit and thereby setting the resonance frequency of the circuit.

By optionally providing several parallel or series-connected coil/capacitor combinations on the label, the distribution of the different frequencies can be enlarged, so that tolerances, which are necessary due to the manufacturing process, do not give rise to any readout errors in identification. These reading errors can also be avoided, for instance, by having the lowest resonance frequency always present and using it as a reference frequency for the other resonance frequencies which represent the different codes.

Figure 6:
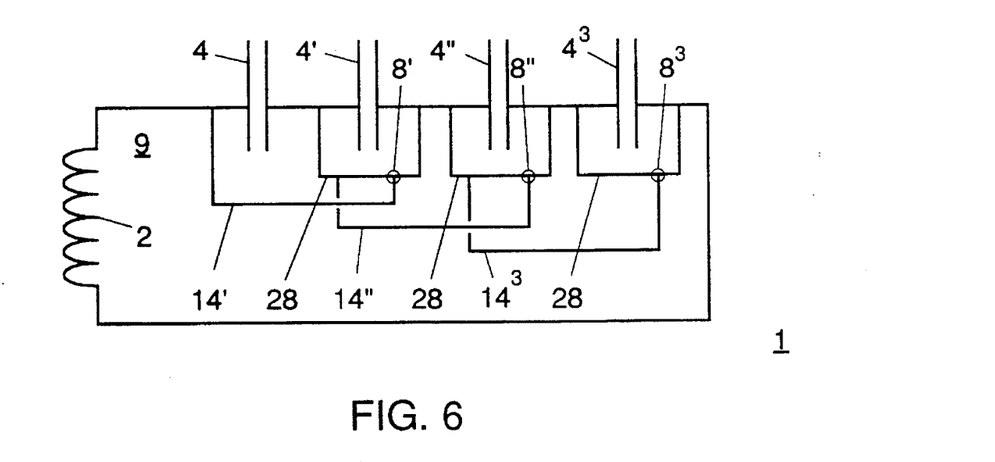
FIG. 6 shows a fifth embodiment of an electric circuit for a label or tag according to the invention.

FIG. 6 shows an alternative embodiment of a label, in which the coil is coupled to a number of series-connected capacitors 4, 4', ... $4^{(3)}$. Except for at least one capacitor, being capacitor 4 in this example, all other capacitors are each short-circuited by means of a short-circuit connection 28. The resonance frequency is therefore initially formed by the coil 2 and the capacitor 4.

On each short-circuit connection 28, a pyrotechnic mixture 8', 8", ... $8^{(3)}$ is provided. When an electromagnetic pulse is radiated at the resonance frequency of the electric resonance circuit 9, the voltage on capacitor 4 will rise, all this in such a manner that the pyrotechnic mixture 8' is ignited by means of the conductor 14'. The short-circuit connection 28 associated with the capacitor 4' is then severed. This means that the electric resonance circuit now consists of the coil 2 and the capacitors 4 and 4' connected in series thereto. The electric resonance circuit now has a resonance frequency $F_o'$. When subsequently again a strong electromagnetic pulse of a frequency $F_o'$ is radiated, the voltage over both the capacitor 4 and the capacitor 4' will rise. When the voltage over the capacitor 4' rises sufficiently, the pyrotechnic mixture 8" can be ignited by means of the conductor 14". In that case the short-circuit connection 28 associated with the capacitor 4" will be severed. The advantage of the label according to FIG. 6 is therefore that the order in which the capacitors are added to the electric resonance circuit is predetermined. It will be clear that the label 1 can be coded in this way.

Figure 7:
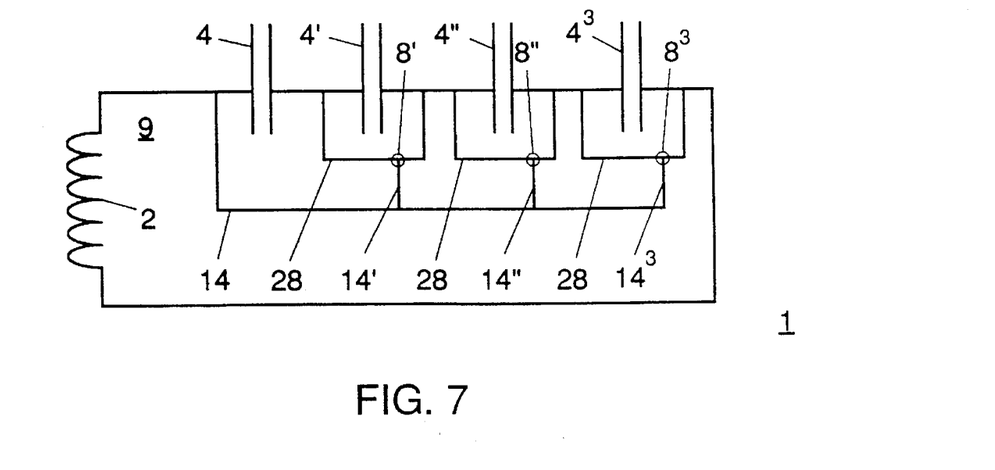
FIG. 7 shows a sixth embodiment of an electric circuit for a label or tag according to the invention.

FIG. 7 shows an alternative embodiment of a label according to the invention. Here, too, as discussed with reference to FIG. 6, a number of capacitors 4, 4', 4", $4^{(3)}$ are connected in series with each other and in series with a coil 2. Again, all capacitors except one are short-circuited by means of a short-circuit connection 28. The resonance frequency of the electric resonance circuit 9 is intially determined by the coil 2 and the capacitor 4. By radiating a sufficiently strong electromagnetic pulse of a frequency $F_o$, one of the pyrotechnic mixtures 8', 8", $8^{(3)}$ will be ignited by means of the conductor 14. Here it is not predetermined which of the pyrotechnic mixtures 8', 8", $8^{(3)}$ will be ignited because the voltage for a breakdown at one of the pyrotechnic mixtures is the same for all pyrotechnic mixtures. If the capacitors 4', 4" and 4$^{(3)}$ all have the same capacitance, the new resonance frequency after breakdown is known. By radiating a new electromagnetic pulse at this new resonance frequency, another short-circuit connection 28 can be severed in entirely analogous manner. It will be clear that the order in which the pyrotechnic mixtures are caused to ignite can be influenced by varying the distance between a short-circuit connection and the free end of a conductor 14', 14", 14$^{(3)}$ situated near the short-circuit connection. The smaller the distance, the greater the chances of breakdown occurring.

Figure 8:
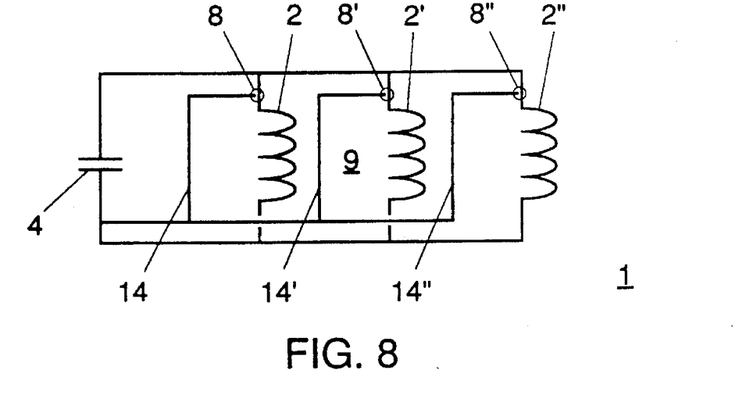
FIG. 8 shows a seventh embodiment of an electric circuit for a label or tag according to the invention.

FIG. 8 shows an alternative embodiment of a label according to the invention, in which an electric resonance circuit is formed by a capacitor 4 and a number of parallel-connected coils 2, 2', 2". As appears from the figure, each coil 2, 2', 2" can be electrically uncoupled from the electric resonance circuit 9 by ignition of a pyrotechnic mixture 8, 8', 8". The voltage over the capacitor 4 is again used to generate a spark at one of the pyrotechnic mixtures. The order in which the pyrotechnic mixtures 8, 8', 8" are caused to combust is again not fixed. The resonance frequency of the electric resonance circuit 9 according to FIG. 8 is determined by the capacitor 4 and the coils 2, 2', 2". When an electromagnetic pulse of a frequency equal to a resonance frequency is radiated, the voltage over the capacitor 4 will rise and breakdown will occur at one of the pyrotechnic mixtures, with the consequence that one of the coils 2, 2', 2" is functionally removed from the electric resonance circuit 9. By removing one or more coils, the resonance frequency of the electric resonance circuit can be adjusted, so that a coding corresponding therewith is provided. When all coils are functionally removed, the label according to FIG. 8 is deactivated.

Figure 9:
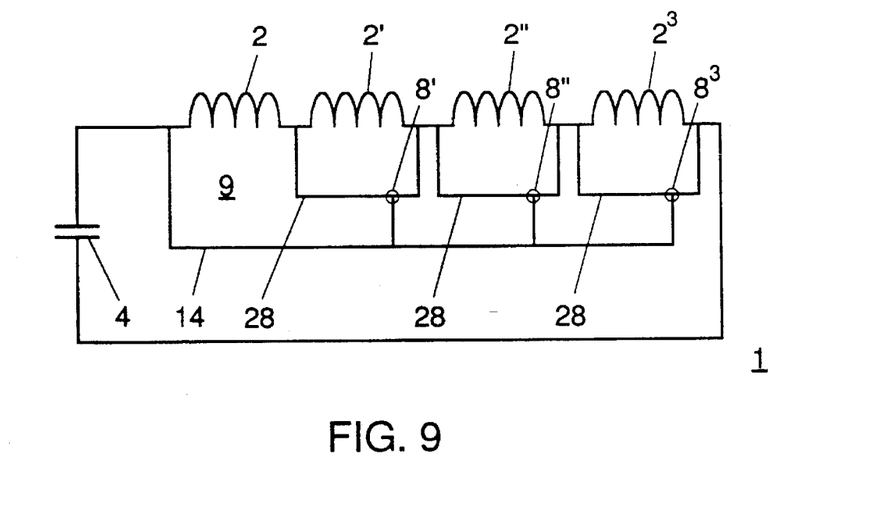
FIG. 9 shows an eighth embodiment of an electric circuit for a label or tag according to the invention.

FIG. 9 shows an alternative embodiment of a label according to the invention, in which a number of coils 2, 2', 2", 2$^{(3)}$ are connected in series and are connected in series with the capacitor 4. In this example the coils 2', 2", 2$^{(3)}$ are each short-circuited by means of a short-circuit connection 28. Each short-circuit connection 28 can, as described hereinabove, be severed by ignition of a pyrotechnic mixture 8', 8", 8$^{(3)}$. The breakdown voltage for the ignition of a pyrotechnic mixture is again derived from the capacitor 4 by means of a conductor 14.

Figure 10:
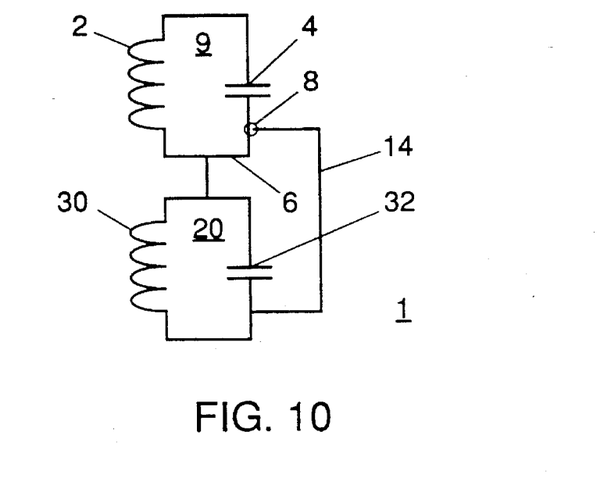
FIG. 10 shows a ninth embodiment of an electric circuit for a label or tag according to the invention.

In the exemplary embodiments of a label according to the invention as discussed so far, the breakdown voltage for the ignition of a pyrotechnic mixture 8 was generated by the electric resonance circuit 9 itself. The electric resonance circuit 9 accordingly comprised a tuned circuit 20, which, together with a conductor 14, forms ignition means for the pyrotechnic mixture. FIG. 10, however, shows an embodiment where a separate ignition means 20 is provided in the form of a tuned circuit and a feed line 14. A tuned circuit of the ignition means 20 comprises a coil 30 and a capacitor 32. By means of line 14 the voltage over the capacitor 32 is carried close to the conductor 6, so that at a sufficiently high voltage over the capacitor 32 a breakdown occurs between the conductor 14 and the conductor 6. The pyrotechnic mixture 8 is then ignited and line 6 is severed. As a result, the electric resonance circuit 9 is deactivated.

The advantage of the label according to FIG. 10 is that the resonance frequency of the tuned circuit 20 is different from the resonance frequency of the electric resonance circuit 9. Accordingly, for deactivating the label an electromagnetic pulse can be radiated of a resonance frequency F', which is different from the frequency of the electromagnetic field which is used to detect the antitheft label, this last frequency corresponding with the resonance frequency of the electric resonance circuit 9.

Figure 11:
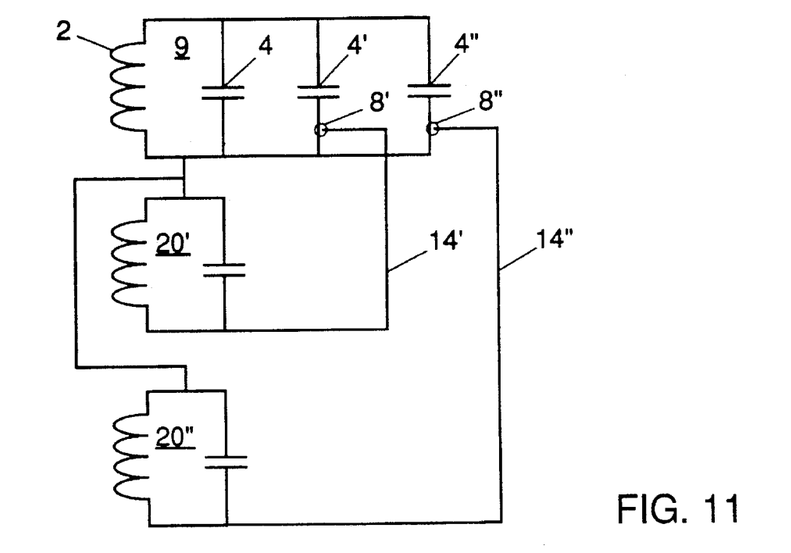
FIG. 11 shows a tenth embodiment of an electric circuit for a label or tag according to the invention.

FIG. 11 shows a codable label comprising an electric resonance circuit 9 which is formed by a coil 2 and a number of capacitors 4, 4', 4". Further, the label comprises an ignition means 20' for functionally removing the capacitor 4' from the electric resonance circuit 9 and an ignition means 20" for functionally removing the capacitor 4" from the electric resonance circuit 9. The ignition means 20' and 20" in this example each comprise a tuned circuit having a different resonance frequency. As a consequence of all this, depending on the frequency at which a strong electromagnetic pulse is radiated, either the ignition means 20' or the ignition means 20" is activated. It is therefore possible to pre-determine which of the capacitors 4' or 4" will be removed from the electric resonance circuit 9.

Figure 12:
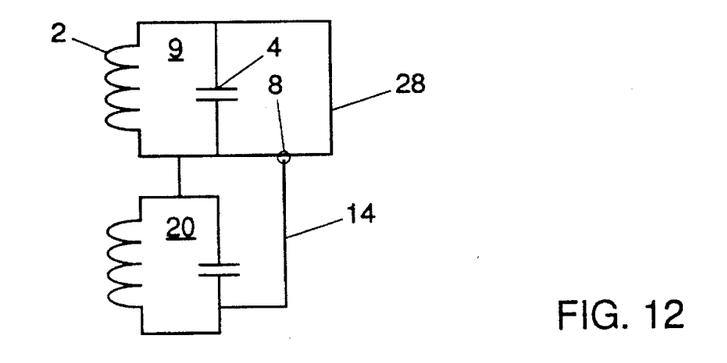
FIG. 12 shows an eleventh embodiment of an electric circuit for a label or tag according to the invention.

FIG. 12 shows an alternative embodiment of a label which is initially deactivated. The label comprises an electric resonance circuit 9 made up of a coil 2 and a capacitor 4. The capacitor 4 is short-circuited by means of a short-circuit connection 28. This means that the electric resonance circuit 9 is deactivated. However, the label according to FIG. 12 additionally comprises separate ignition means 20, again comprising a tuned circuit. By radiating an electromagnetic pulse of a frequency which corresponds with the frequency of the tuned circuit of the ignition means 20, the pyrotechnic mixture 8 can be ignited to sever the short-circuit connection 28. In that case the label is permanently activated.

Figure 13:
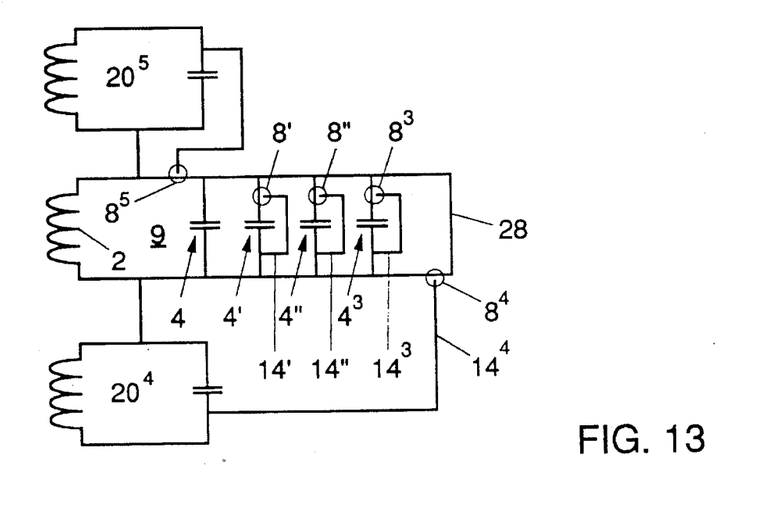
FIG. 13 shows a twelfth embodiment of an electric circuit for a label or tag according to the invention.

Finally, FIG. 13 shows an embodiment of a label which comprises an electric resonance circuit 9 as discussed with reference to FIG. 5. However, the entire circuit is short-circuited by means of a short-circuit connection 28. This means that the label is not active initially. However, the label comprises ignition means 20$^{(4)}$ comprising a tuned circuit by means of which the short-circuit connection 28 can be severed. Accordingly, by radiating an electromagnetic pulse of a frequency corresponding with the resonance frequency of the tuned circuit of the ignition means 20$^{(4)}$, the electric resonance circuit 9 can be activated. Then the label can be coded as described with reference to FIG. 5. In addition, the label further comprises an ignition means 20$^{(5)}$. By radiating an electromagnetic pulse of the frequency corresponding with the frequency of the tuned circuit of the ignition means 20$^{(5)}$, the label can be definitively deactivated as discussed with reference to FIG. 10.

Because in all of the exemplary embodiments outlined hereinabove, programming the code gives rise to combustion, which in turn generates much heat, it is possible, by means of this heat, to color a thermosensitive layer 30 (see FIG. 14), corresponding to the layer applied to thermopaper for the purpose of thermoprinting. In this way readable information can be provided on the label, for instance in the form of a credit card.

Figure 14:
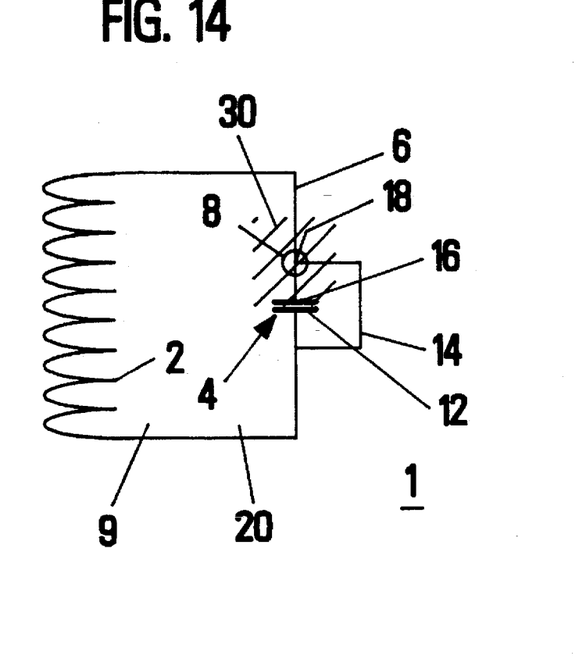
FIG. 14 shows a thirteenth embodiment of an electric circuit for a label or tag comprising a thermosensitive layer according to the invention.

This readable information can for instance consist of a bar which indicates the residual value of the card in per cent and to that end consists of 100 dots which color as a result of the combustion of the 100 dots of pyrotechnic material which are provided under them, the capacitor value of an LC circuit giving 100 different values through the combustion of a track.

Figure 15:
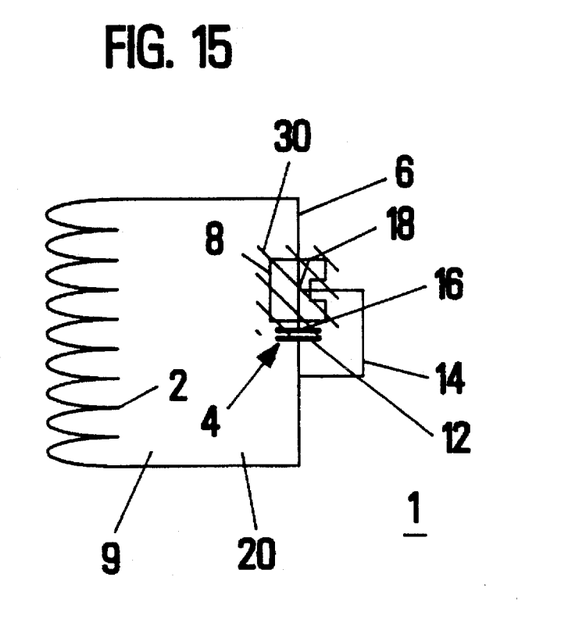
FIG. 15 shows a fourteenth embodiment of an electric circuit for a label or tag comprising a thermosensitive layer according to the invention.

Of course, in the same manner it is also possible to provide text (or characters) by providing the text (or characters) beforehand under the thermal layer 30 using pyrotechnic ink 8, so that upon combustion readable text 8 (or characters) appear on the thermopaper (see FIG. 15). Particularly those labels which make it possible to determine beforehand which of the pyrotechnic mixtures present will be combusted, a thermosensitive layer can be used advantageously.

In order to limit the consequences of the combustion reaction, a fire-resistant protective foil can be provided on opposite sides of the pyrotechnic material to prevent damage to the goods on which the labels are provided.

I claim:

1. A contactless label for antitheft or identification purposes, comprising an electric circuit, wherein the label comprises a pyrotechnic mixture which is provided adjacent at least one electroconductive connection of the electric circuit, in such a manner that the pyrotechnic mixture upon being ignited severs the electroconductive connection by combustion, with the electrical properties of the electric circuit altering as a result of the severance of the electroconductive connection.

2. A contactless label according to claim 1, wherein the pyrotechnic mixture is provided on the electroconductive connection.

3. A contactless label according to claim 1, wherein at least a part of the electric circuit is deactivated when the electroconductive connection is severed.

4. A contactless label according to claim 3, wherein the electric circuit comprises at least one electric resonance circuit in the form of at least one coil and at least one capacitor, while by ignition of the pyrotechnic mixture the resonance circuit is severed and the electric circuit is deactivated.

5. A contactless label according to claim 4, wherein a number of pyrotechnic mixtures are provided for respectively terminating the currents through a number of the short-circuit connections.

6. A contactless label according to claim 4, wherein the electric circuit comprises a number of electric resonance circuits having mutually different resonance frequencies for increasing the number of available codes of the label.

7. A contactless label according to claim 1, wherein the electric circuit can be coded by severing the at least one electroconductive connection.

8. A contactless label according to claim 7, wherein the label comprises a number of pyrotechnic mixtures which are respectively provided near a number of electrical connections of the electric circuit, the electric circuit being codable by selectively severing said electrical connections.

9. A contactless label according to claim 1, wherein at least a part of the electric circuit can be activated by severing the at least one electroconductive connection.

10. A contactless label according to any one of the preceding claims 1–3, 7, 9, wherein the electric circuit comprises at least one electric resonance circuit in the form of a number of parallel-connected coils and at least one capacitor, while by ignition of the at least one pyrotechnic mixture the current through at least one of these coils is terminated, whereby a resonance frequency of the electric resonance circuit alters for coding and/or activating the label.

11. A contactless label according to claim 1, wherein the electric circuit comprises at least one electric resonance circuit in the form of at least one coil and a number of capacitors connected in parallel, while by ignition of the at least one pyrotechnic mixture the current through at least one of these capacitors is terminated, whereby a resonance frequency of the electric resonance circuit alters for coding and/or activating the label.

12. A contactless label according to claim 11, wherein a number of pyrotechnic mixtures are provided for respectively terminating the currents through a number of the parallel-connected capacitors.

13. A contactless label according to claim 1, wherein the electric circuit comprises at least one electric resonance circuit in the form of at least one coil and a number of series-connected capacitors, the capacitors, except for at least one capacitor, each being short-circuited by means of a short-circuit connection, while by ignition of the at least one pyrotechnic mixture at least one short-circuit connection is severed, whereby a resonance frequency of the resonance circuit alters for coding and/or activating the label.

14. A contactless label according to claim 1, wherein the electric circuit comprises at least one electric resonance circuit in the form of at least one capacitor and a number of series-connected coils, the coils, except for at least one coil, each being short-circuited by means of a short-circuit connection, while by ignition of the at least one pyrotechnic mixture at least one short-circuit connection is severed, whereby a resonance frequency of the resonance circuit alters for coding and/or activating the label.

15. A contactless label according to claim 1, wherein the label comprises ignition means which upon receiving an electromagnetic field generate a spark for igniting the at least one pyrotechnic mixture.

16. A contactless label according to claim 15, wherein the ignition means comprise at least one tuned circuit with a capacitor and conductors coupled thereto, while by causing the tuned circuit to oscillate through electromagnetic induction, a sufficiently high voltage arises over the capacitor of the tuned circuit and the conductors coupled thereto in order that the spark is generated at a predetermined position where the conductors have a particular small distance relative to each other.

17. A contactless label according to claim 16, wherein the tuned circuit is part of the electric resonance circuit.

18. A contactless label according to claim 16, wherein the ignition means comprise a number of circuits tuned to different frequencies and conductors coupled thereto, for respectively and selectively igniting a number of pyrotechnic mixtures.

19. A contactless label according to claim 1, wherein in order to limit the combustion reaction of the at least one pyrotechnic mixture, at least one protective fire-resistant foil is provided on the label.

20. A contactless label according to claim 1, wherein the label further comprises a thermosensitive layer which colors visibly when the at least one pyrotechnic mixture combusts.

21. A contactless label according to claim 20, wherein through the coloration of the thermosensitive layer, characters are depicted on the label.

22. A contactless label according to claim 21, wherein the pyrotechnic mixture consists of one or a combination of the substances $Pb_3O_4$, Si, Ti and $Fe_2O_3$; $PbCrO_4$ and Zr; $Pb_3O_4$, Si and $KNO_3$; or $Pb_3O_4$ and Si.

23. An electric circuit for use in a label according to claim 1.

24. A deactivation and/or coding system, comprising at least one label according to claim 1 and further comprising a transmitter unit for generating an electromagnetic field by means of which the pyrotechnic mixture is ignited.

* * * * *